United States Patent [19]

Miura

[11] Patent Number: 5,485,564
[45] Date of Patent: Jan. 16, 1996

[54] METHOD AND APPARATUS FOR FORMING A GRAPHICAL DISPLAY OF DATA AND FOR OMITTING A RANGE OF DATA WITHIN THE GRAPH

[75] Inventor: Ayako Miura, Midorigaoka, Japan

[73] Assignee: Canon Kabushiki Kaisha, Tokyo, Japan

[21] Appl. No.: 53,686

[22] Filed: Apr. 29, 1993

[30] Foreign Application Priority Data

May 8, 1992 [JP] Japan ..................... 4-141975

[51] Int. Cl.$^6$ .................................................. G06T 11/00
[52] U.S. Cl. .................. 395/140; 395/133; 395/134; 395/139
[58] Field of Search ............ 395/118, 127–129, 395/133–135, 139–143, 155, 161; 345/127, 131, 133, 140

[56] References Cited

U.S. PATENT DOCUMENTS

| | | | |
|---|---|---|---|
| 4,277,835 | 7/1981 | Garziera et al. ........................ | 395/140 |
| 4,812,996 | 3/1989 | Stubbs .................................. | 395/140 X |
| 4,954,981 | 9/1990 | Dehner, Jr. et al. ................... | 395/140 |
| 5,138,252 | 8/1992 | Ferguson ............................. | 395/140 X |
| 5,216,756 | 6/1993 | Senba .................................. | 395/140 |

*Primary Examiner*—Almis R. Jankus
*Attorney, Agent, or Firm*—Fitzpatrick, Cella, Harper & Scinto

[57] ABSTRACT

A method of forming graphs includes steps for storing numerical data to be presented as a graph and determining an omission-range to specify a range of data to be omitted when the numerical data is presented as a graph. Display positions are determined for the stored numerical data on either side of the range of data that is to be omitted when the numerical data is presented as a graph based on the input omission-range. A graph corresponding to the stored numerical data on either side of the range of data to be omitted is formed based on the display positions determined.

18 Claims, 13 Drawing Sheets

METHOD AND APPARATUS FOR FORMING A GRAPHICAL DISPLAY OF DATA AND FOR OMITTING A RANGE OF DATA WITHIN THE GRAPH

BACKGROUND OF THE INVENTION

1. Field of the Invention

This invention relates to a method and an apparatus for forming graphs on the basis of numerical data and, in particular, to a method and an apparatus for forming graphs with partial omissions.

2. Description of the Related Art

By using an apparatus of this type, which is capable of forming and displaying graphs, it has been possible to form various kinds of graphs on the basis of numerical data like table-calculation data, thereby easily visualizing numerical fluctuations to facilitate achievement analysis, etc.

With such an apparatus, the scale of the relevant graph axis is determined automatically when the numerical data to be presented in the form of a graph is designated by the operator. This axis scale is usually displayed in a continuous form with the scale division set by taking into consideration the range from "0" to the maximum value of the numerical data, so that all the designated numerical data is displayed.

In the case of data which, when displayed in the form of a graph, exhibit such small differences therebetween as to be rather difficult to read, the following conventional measure may be taken: the section between the maximum and minimum values of these items of data is enlarged, and the section below the minimum value of the data is omitted. This makes it possible to present the differences between these items of data in a focused, enlarged state while preventing the graph as a whole from becoming excessively large.

However, such conventional methods and apparatuses for forming graphs have a problem in that they allow only the section below the minimum value of the numerical data to be omitted. Therefore, the above omitting method has not been applicable to numerical data of a type in which the values thereof are dispersed in such a way as to be grouped around maximum and minimum values.

Another problem with conventional methods and apparatuses for forming graphs is that the display range of a graph representing any designated numerical data is determined from the maximum and minimum values of the numerical data. Thus, in the case of numerical data dispersed over such a wide range that the ratio of the difference between the maximum and minimum values to the maximum value is large, it has been impossible to form a graph with satisfactory display efficiency.

Further, with conventional methods and apparatuses for forming graphs, it has been impossible for the operator to arbitrarily designate the graph range to be omitted so that the portion on which the operator wishes to concentrate can be presented in a focused state.

Still further, when data represented, for example, as a connected-line graph, is displayed with a partial omission, no technique has been available in conventional methods and apparatuses for forming graphs which would make it possible to display a line connecting the data displayed on one side of the omitted section to the data on the other side thereof or a line connecting the data which has been omitted in the display to the data on either side of the omitted section.

SUMMARY OF THE INVENTION

It is an object of the present invention to provide a method and an apparatus for forming graphs which enable an operator to arbitrarily designate a section to be omitted, thereby making it possible to form a graph in which the portion the operator wishes to concentrate upon is presented in a focused state regardless of the nature of the data.

Another object of the present invention is to provide a method and an apparatus for forming graphs in which it is possible, when, for example, data is represented as a connected-line graph with a partial omission, to display a line connecting the data on one side of the omitted section to the data on the other side thereof or a line connecting the data which has been omitted in the display to the data on either side thereof, thereby making it possible to form a graph which can be displayed with its middle section or the like omitted without impairing the overall effectiveness of the graph.

Still another object of the present invention is to provide a method and an apparatus for forming graphs in which it is possible to effect a partial omission of the display even in the case of data whose values are dispersed in such a way as to be grouped around maximum and minimum values, by spotting a section where data values are sparsely scattered and omitting that section.

A further object of the present invention is to provide a method and an apparatus for forming graphs in which the way the values of designated data are dispersed when displayed as a graph is examined to find a section in which there is no data display and omit that section, thereby making it possible to form a graph with high display efficiency in accordance with any designated numerical data even in the case of data whose values are dispersed over a wide range and in which the ratio of the difference between the maximum and the minimum values to the maximum value is large.

In accordance with the present invention, the operator is enabled to arbitrarily designate a section to be omitted in a graph display, thereby making it possible to form a graph in which that portion the operator wishes to concentrate upon is presented in a focused state regardless of the nature of the data.

In accordance with the present invention, it is possible, when, for example, data is displayed as a connected-line graph with a partial omission, to display a line connecting the data on one side of the omitted section to the data on the other side thereof, or a line connecting the data which has been omitted in the display to the data on either side of the omitted section, thereby making it possible to form a graph which can be displayed with its middle section or the like omitted without impairing the overall effectiveness of the graph.

In accordance with the present invention, a middle section of a graph of designated data where data values are sparsely scattered is found from the display of the data and is omitted, thereby making it possible to form a graph display with a partial omission even when data is dispersed in such a way as to be grouped around the maximum and minimum values thereof.

Further, in accordance with the present invention, the way the values of designated data are dispersed when displayed as a graph is examined to find a section in which there is no data display and omit that section, thereby making it possible to form a graph with high display efficiency in accordance with any designated numerical data even in the case of data whose values are dispersed over a wide range and in which the ratio of the difference between the maximum and the minimum values to the maximum value is large.

Thus, the present invention provides various remarkable advantages. For example, the graph processing functions of a graph forming apparatus can be substantially intensified. Further, the appeal of a document which includes various graphs can be remarkably improved, and an efficient presentation can be achieved in which various graphs are combined together within a limited range.

DESCRIPTION OF THE PREFERRED EMBODIMENT

Figure 1:
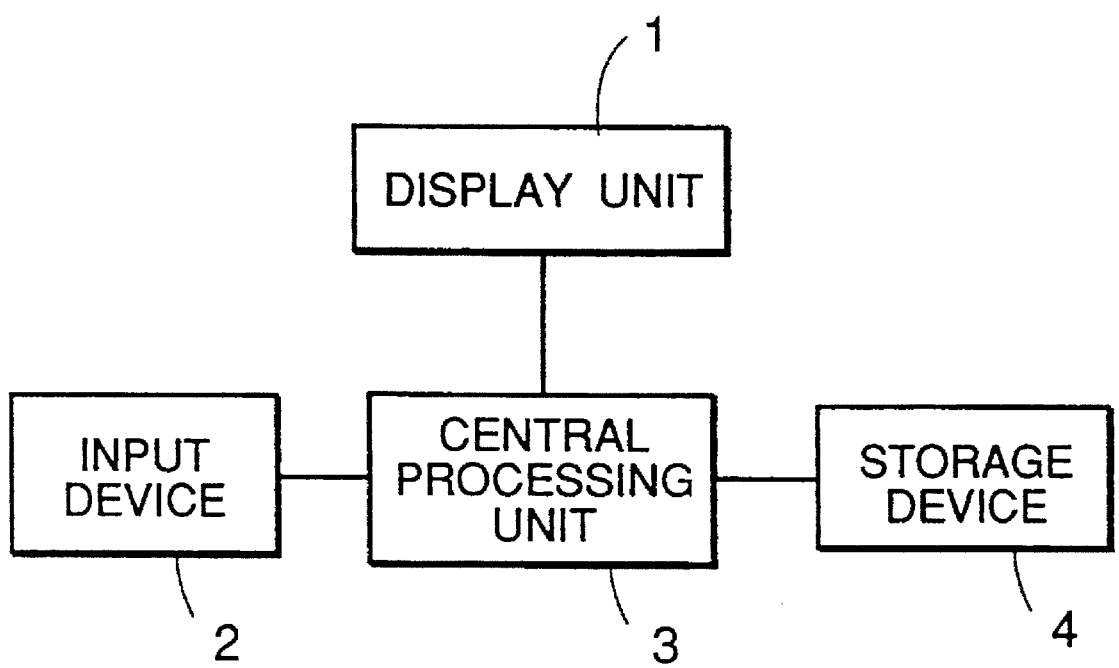
FIG. 1 is a block diagram showing the configuration of an information processing system to which a graph display system according to an embodiment of this invention is applied.

FIG. 1 is a block diagram showing the configuration of an information processing system to which a graph display system according to an embodiment of the present invention is applicable.

Referring to FIG. 1, numeral 1 indicates a display device, which displays document data, table-calculation data, etc. processed by a central processing unit 3 on the basis of information designated or numerically input from an input device 2. Numeral 4 indicates a storage device, which stores control programs including the control procedures of FIGS. 2 and 3 executed by the central processing unit 3. Further, the storage device 4 is equipped with a work area for storing control information needed for information processing. The storage device 4 may consist of a hard disk, a floppy disk, a semiconductor memory, etc.

It goes without saying that as long as the functions of the present invention can be executed, the system of the present invention is applicable to any type of system regardless of whether it is a unitary apparatus or a system composed of a plurality of apparatuses or a system in which processing is carried out through a network like an LAN.

The graph display system of the present invention will now be described with reference to the flowcharts of FIGS. 2 and 3 and FIGS. 4 through 6. Basically, the graph display system includes the procedures of: determining desired maximum and minimum values of a graph axis to be displayed on the display means (the display device 1); setting the axis range whose numerical display is to be omitted, on the basis of the determined maximum and minimum values; obtaining information on a converted display position of each item of the numerical data in conformance with a focused display range which is determined by the maximum and minimum values determined above; and displaying a graph corresponding to the numerical data on the basis of the data obtained above, that is, the information on the converted-display positions of the items of the numerical data and the axis range whose numerical display is to be omitted, whereby it is possible to display an enlarged graph concentrating upon the changes in the numerical data.

Figure 2:
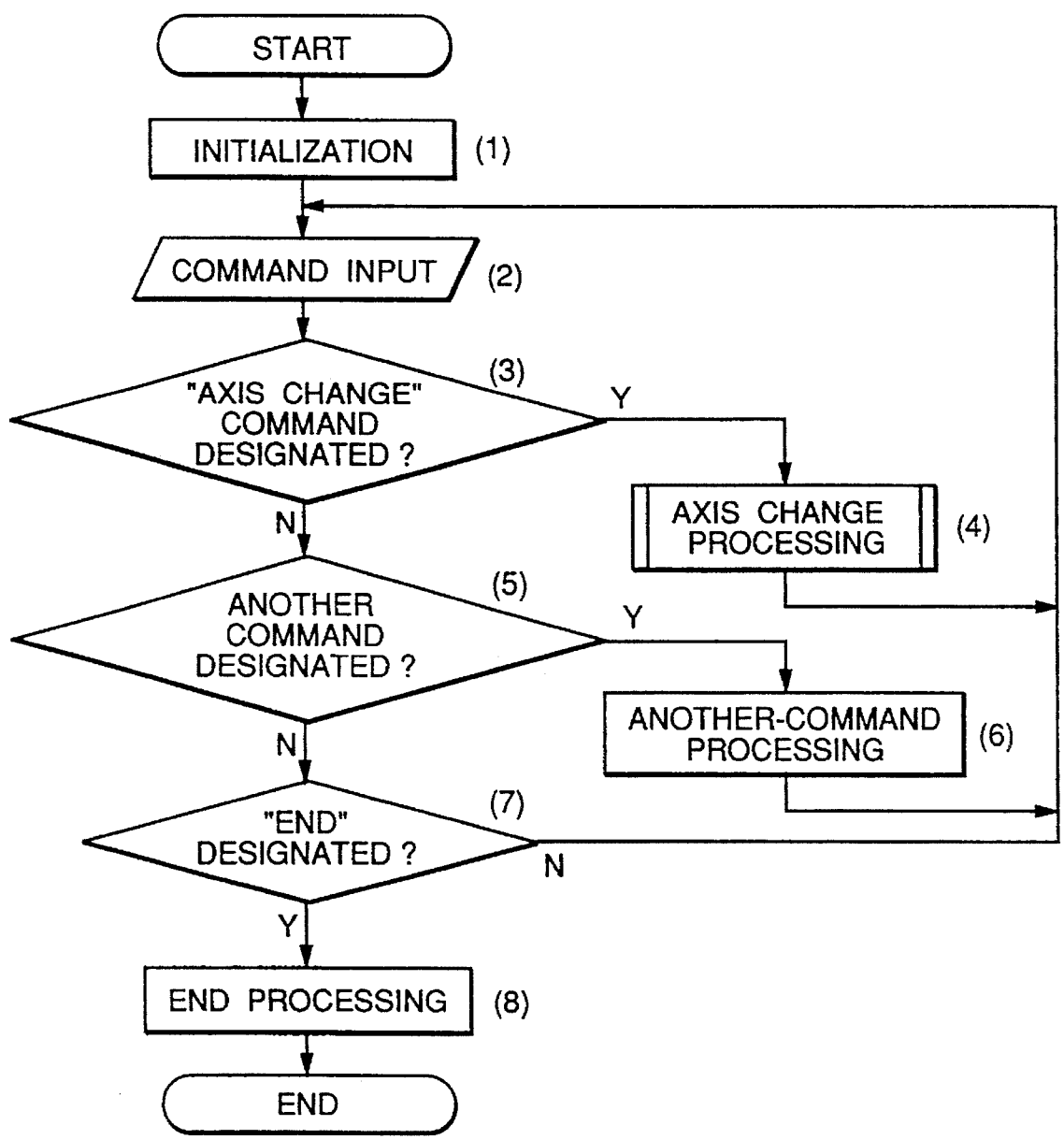
FIG. 2 is a flowchart showing an example of a graph display system according to an embodiment of this invention.

FIG. 2 is a flowchart showing an example of a graph display system according to an embodiment of the present invention. Numerals (1)–(8) indicate the processing steps.

Figure 4:
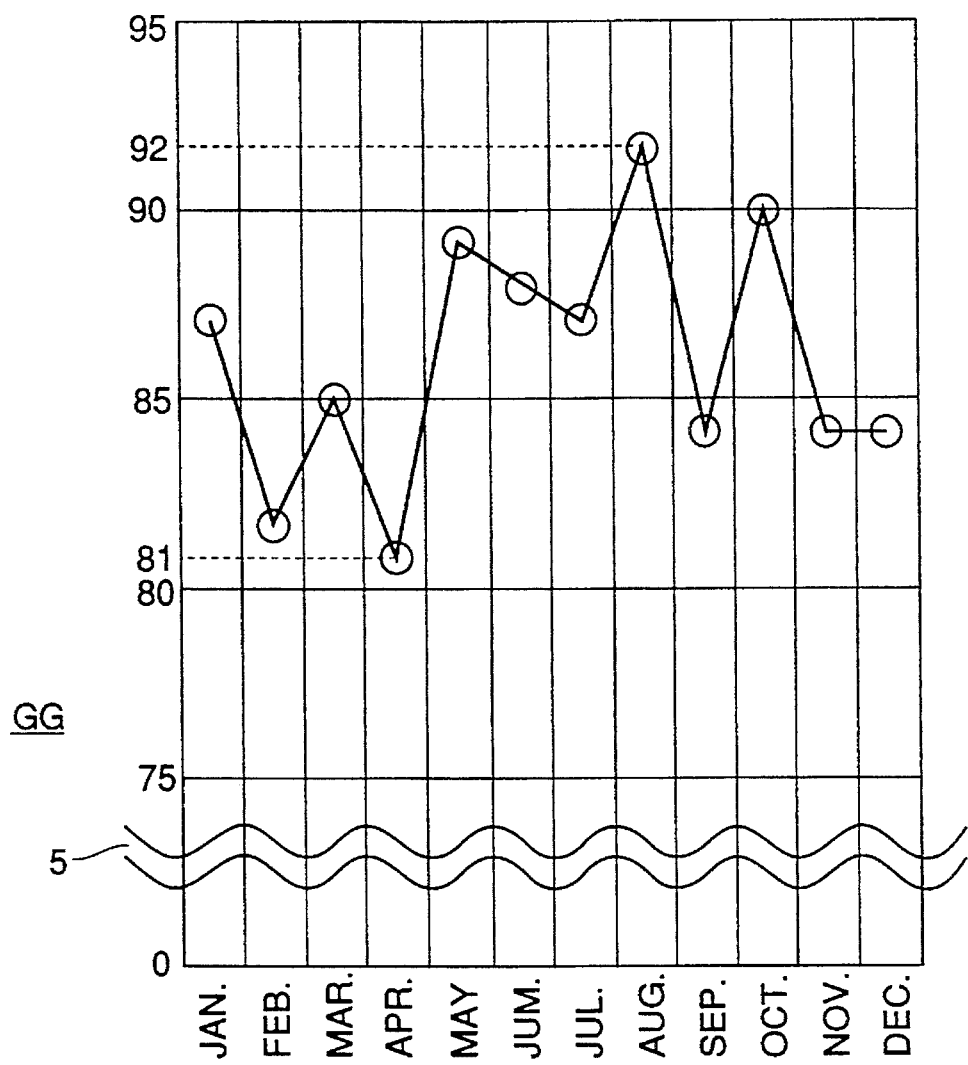
FIG. 4 is a diagram showing an output example based on a graph display system according to an embodiment of this invention.
Figure 5:
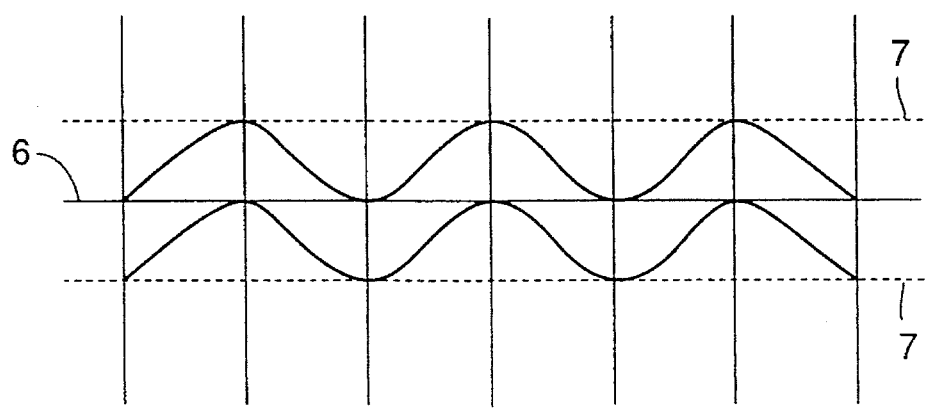
FIG. 5 is a diagram showing how an omission indicator is displayed in graph display system according to an embodiment of this invention.
Figure 6:
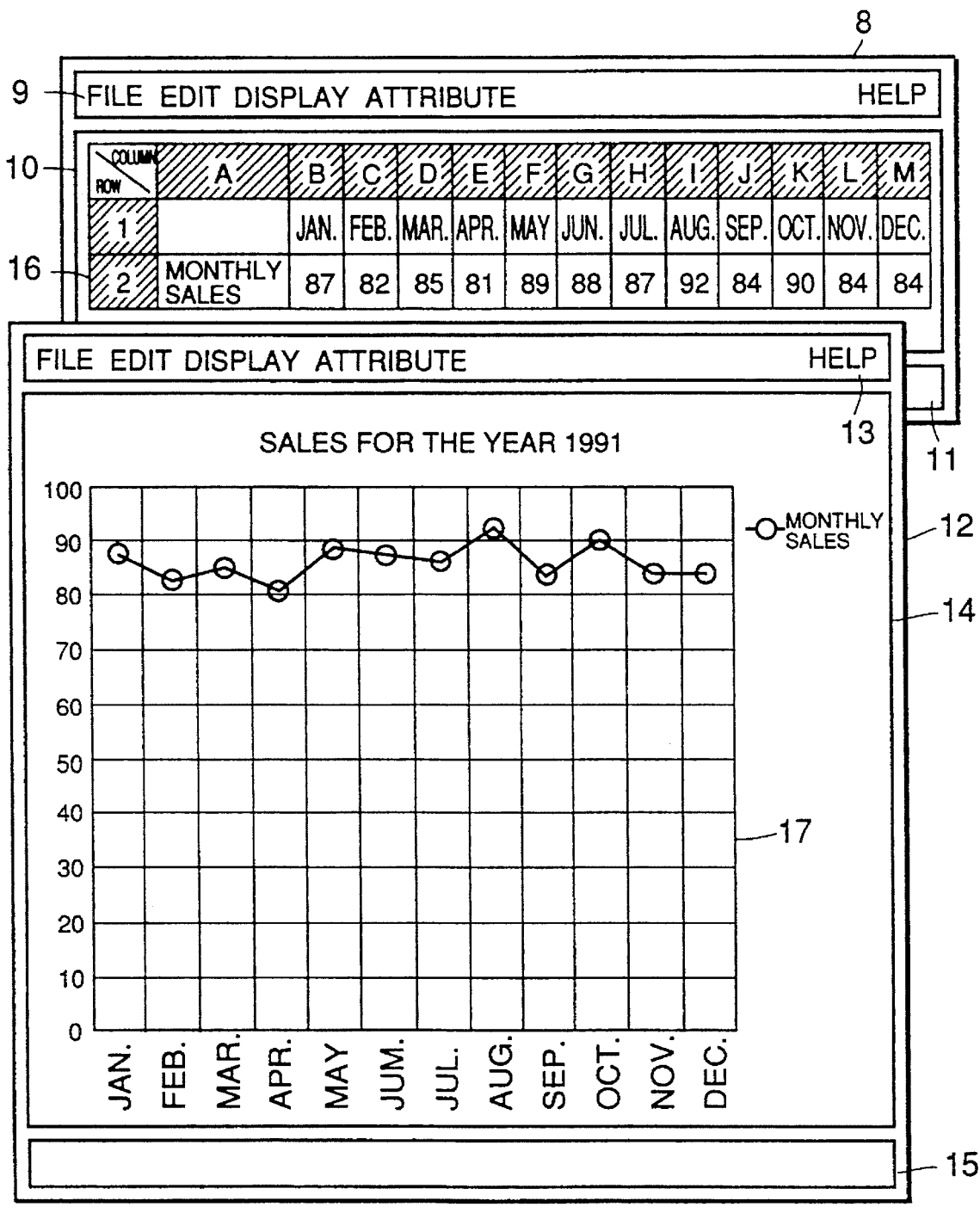
FIG. 6 is a diagram showing how an initial graph-data in-take display is given by the display device shown in FIG. 1.

When started, the information processing system shown in FIG. 1 executes an initialization process as follows: the display device 1 displays edit bars 11 and 15, commands 8, 9 and 13, and edit screens 10, 12 and 14 shown in FIG. 6 and, after table data and graph data have been read from the storage device 4, a table 16 and a graph 17 for editing numerical data are successively displayed on the screens (step (1)). With the items of information of FIG. 6 displayed on the display device 1, the system is ready for command input (step (2)). At this stage, no partial omission is effected on the axes of the graph 17, and all of the graph is displayed. When a command has been input, a judgment is made as to whether the input command is an "axis change" command included in an "attribute" menu (step (3)). The "axis change" command, which is designated and input by the operator, is an instruction command to set the system in a mode in which the display range of a graph axis, the scale division thereof, etc. can be changed. If the judgment result of step (3) is YES, an axis change routine is executed in accordance with the flowchart of FIG. 3 (step (4)), and then the procedure returns to step (2). If the judgment result of step (3) is NO, a judgment is made as to whether the input command is "another command" (step (5)). If the result of this judgment is YES, an another-command processing routine is executed (step (6)), and the procedure returns to step (2). If the judgment result of step (5) is NO, a judgment is made as to whether the input command is an "end" command (step (8)). If the result of this judgment is YES, an end processing, such as updating of the data of tables or graphs or erasing of the edit window, is conducted, and the processing is terminated. By the above processing, the graph 17 shown in FIG. 6 is converted into a graph GG as shown in FIG. 4 whose one axis is partially omitted, as indicated by an omission indicator 5, and this converted graph is displayed on the display device 1. In this embodiment, the omission indicator 5 consists of two splines which extend continuously through a range defined by a width 7 and a center line 6, as shown in FIG. 5.

In the following, the axis-change processing routine of the graph display system of the present invention will be described with reference to the flowchart of FIG. 3. Through this axis-change processing, it is possible to designate an omitted display.

Figure 3:
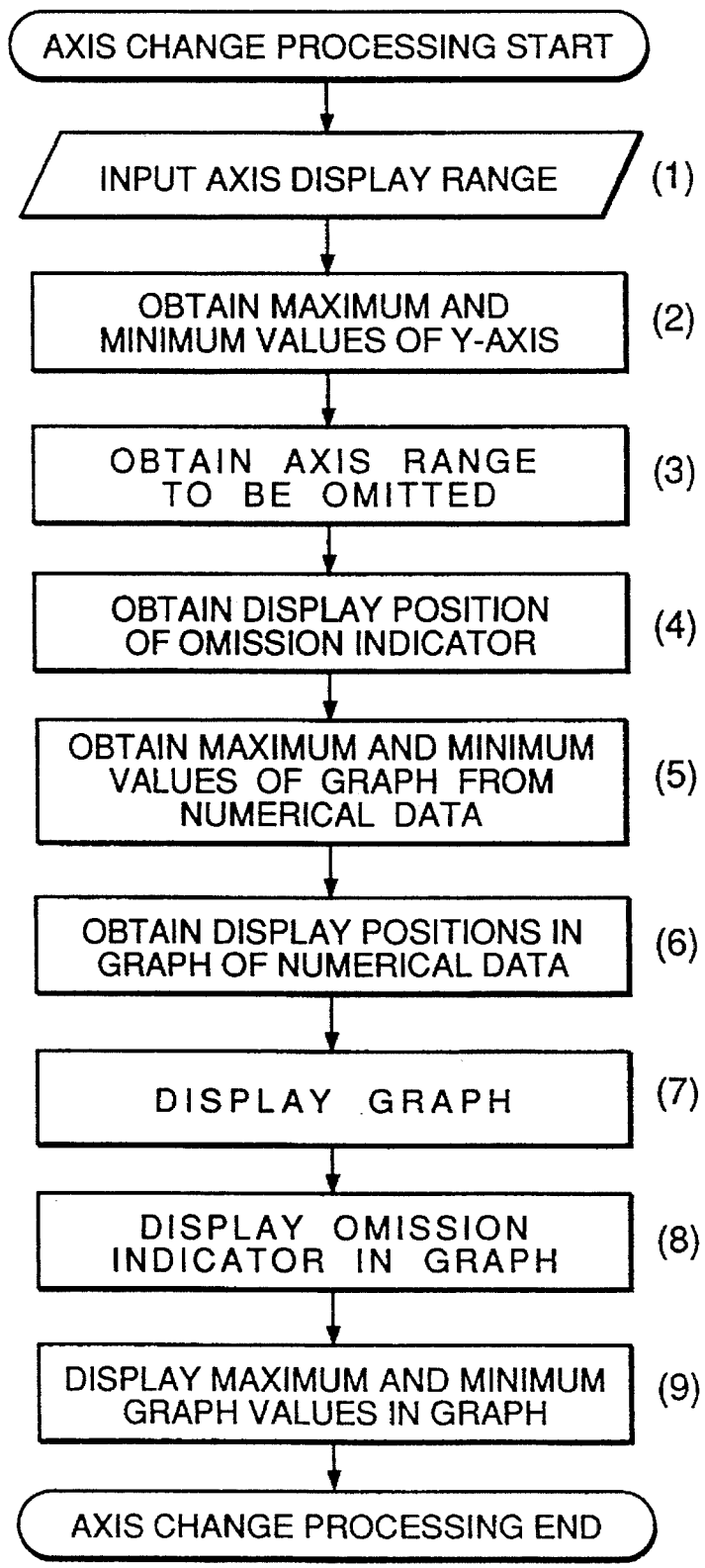
FIG. 3 is a detailed flowchart showing an example of the axis-change routine of the graph display system of this invention.

FIG. 3 is a detailed flowchart showing an example of the axis-change processing routine of the graph display system of the present invention. Numerals (1) through (9) indicate the processing steps.

Figure 7:
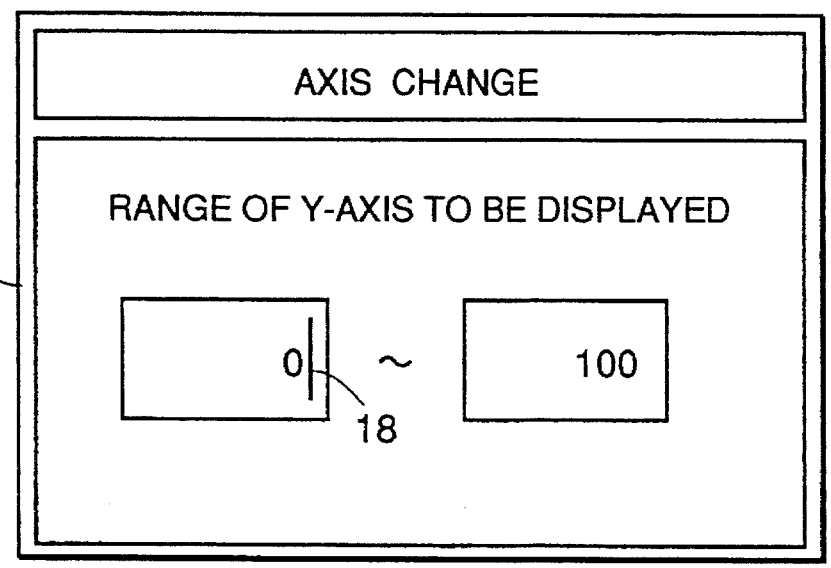
FIG. 7 is a diagram showing an example of a data setting window for axis change in the display device shown in FIG. 1.

As stated above, the axis-change processing is started when the "axis change" command is selected from the "attribute" menu in step (3) of FIG. 2. First, an axis change menu M1 as shown in FIG. 7 is displayed on the display device 1. This axis change menu M1 has a Y-axis-range display, which shows initial values of "100" and "0" as the maximum and minimum values of the graph 17 of FIG. 6, which is being displayed. Further, upon the display of the axis-change menu, a cursor 18 is shown on the screen, which cursor is moved to the position of the lower-limit value of the Y-axis-range display. In this condition, the system is ready for data input.

Figure 8:
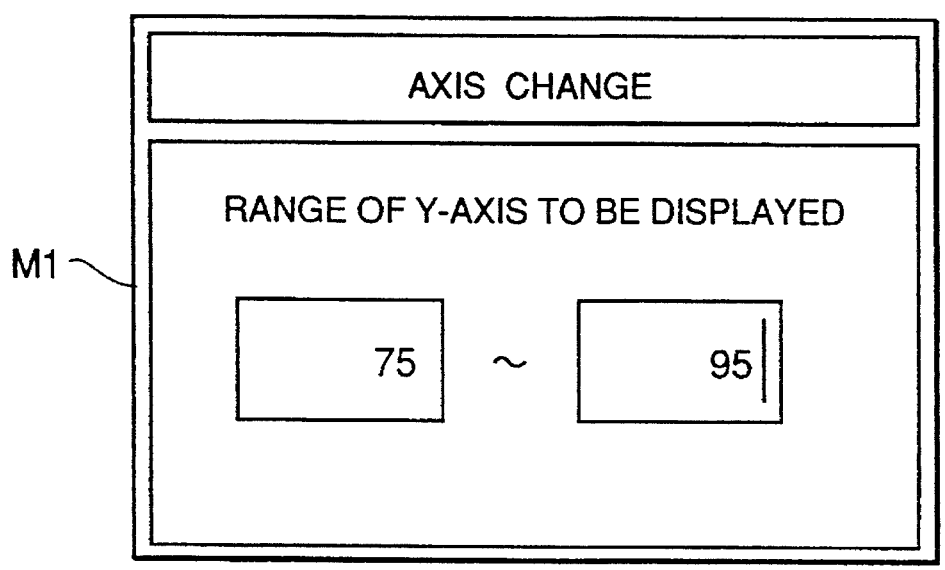
FIG. 8 is a diagram showing an example of the data setting window for axis change in the display device shown in FIG. 1.

When, as shown in FIG. 8, values of "75~95", which specify the maximum and minimum values of the Y-axis range to be displayed, are input through the input device 2 (step (1)), the central processing unit 3 stores the larger one of the displayed Y-axis values, "95" in the storage device 4, as the maximum value of the Y-axis and, since the numerical data consists of positive values only, the central processing unit 3 stores "0" in the storage device 4 as the minimum value of the Y-axis (step (2)). When the maximum and minimum values of the Y-axis have been determined as "95" and "0" respectively, the central processing device 3 obtains the axis range to be omitted in accordance with these values (step (3)). Since the maximum and minimum values of the Y-axis are "95" and "0", respectively, and the Y-axis range to be displayed is from "75" to "95", the range of axis to be omitted is from "0" to "75". When the maximum and minimum values of the axis and the axis range to be omitted have thus been determined, the central processing unit 3 obtains the display position of the omission indicator 5 in the manner described below (step (4)).

First, the display position of the minimum axis value "0" and the display position of the upper-limit value of the axis range to be omitted, i.e., "75" are obtained. The line extending through the center of the section between the display position of the minimum axis value and the display position of the upper-limit value of the axis range to be omitted is regarded as the center line 6 of FIG. 5, and the distance between the splines (the width 7 shown in FIG. 5) is determined in accordance with the distance between the display position of the minimum axis value and the upper-limit value of the axis range to be omitted. The intersections between the vertical axis of the graph and these reference lines (i.e., the center line and the splines) are stored as the display position of the omission indicator 5.

Next, the central processing unit 3 obtains for the plotted values the maximum value of the Y-axis, "92" the , minimum value thereof, "81", and their display positions from the numerical data and stores them in the storage device 4 (step (5)). Subsequently, the central processing unit 3 converts the numerical data into display positions in the graph (step (6)). This conversion from the numerical data to display positions in the graph will be explained with reference to a general example. Roughly speaking, the conversion can be effected by using two types of conversion formulae: formulae for cases where no partial omission is effected on the axis; and formulae for cases where the axis is partially omitted. In connection with the partial omission of the axis, three cases may be considered: a case where the point is above the omission indicator 5; a case where it is below the omission indicator 5; and a case where it is in the omission indicator 5. Thus, the conversion formula is selected from the following formulae (1) through (3), which will be explained in detail with reference to FIGS. 9 through 11.

(When no partial omission of the axis is effected)

Figure 9:
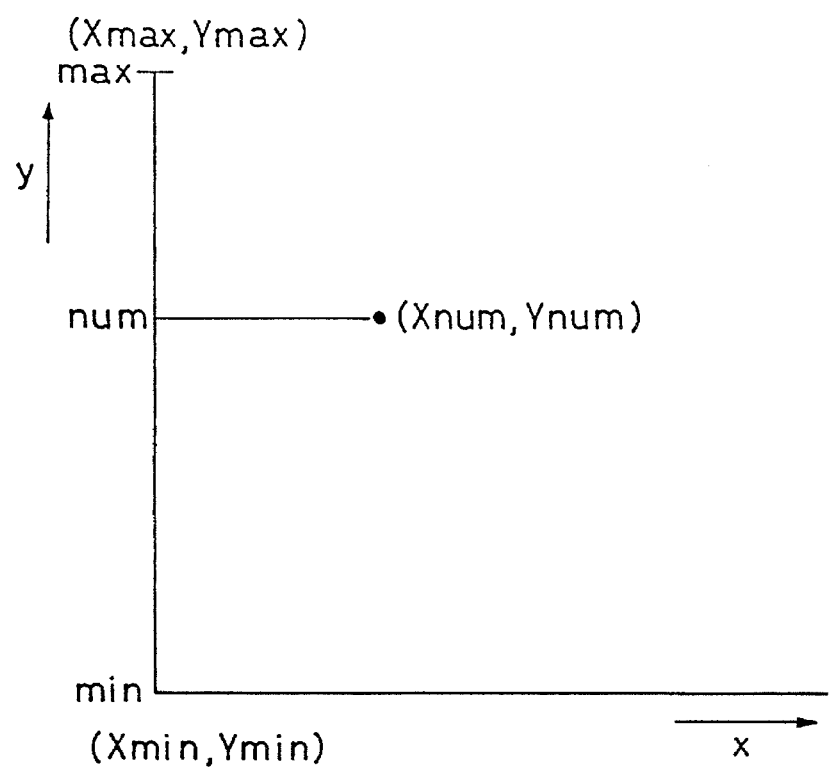
FIG. 9 is a diagram showing a method of calculating a position at which an item of numerical data is displayed on the display device shown in FIG. 1.

The display position of numerical data "num" as shown in FIG. 9 is obtained as follows:

$$per=(num-min)/(max-min) \quad Ynum=Ymin-\{per * (Ymin-Ymax)\} \quad \ldots (1)$$

where "per" represents the proportion of the data to the axis; "max" represents the numerical data of the maximum value of the axis; "min" represents the minimum value of the numerical data of the axis; and "num" represents the numerical data whose display position is to be obtained. The display position of each item of numerical data is represented as "X??,Y??". When there is no partial axis omission, the display position of any point in the graph can be obtained from the above formula. (When the axis is partially omitted)

[When the point is above the omission indicator]

Figure 10:
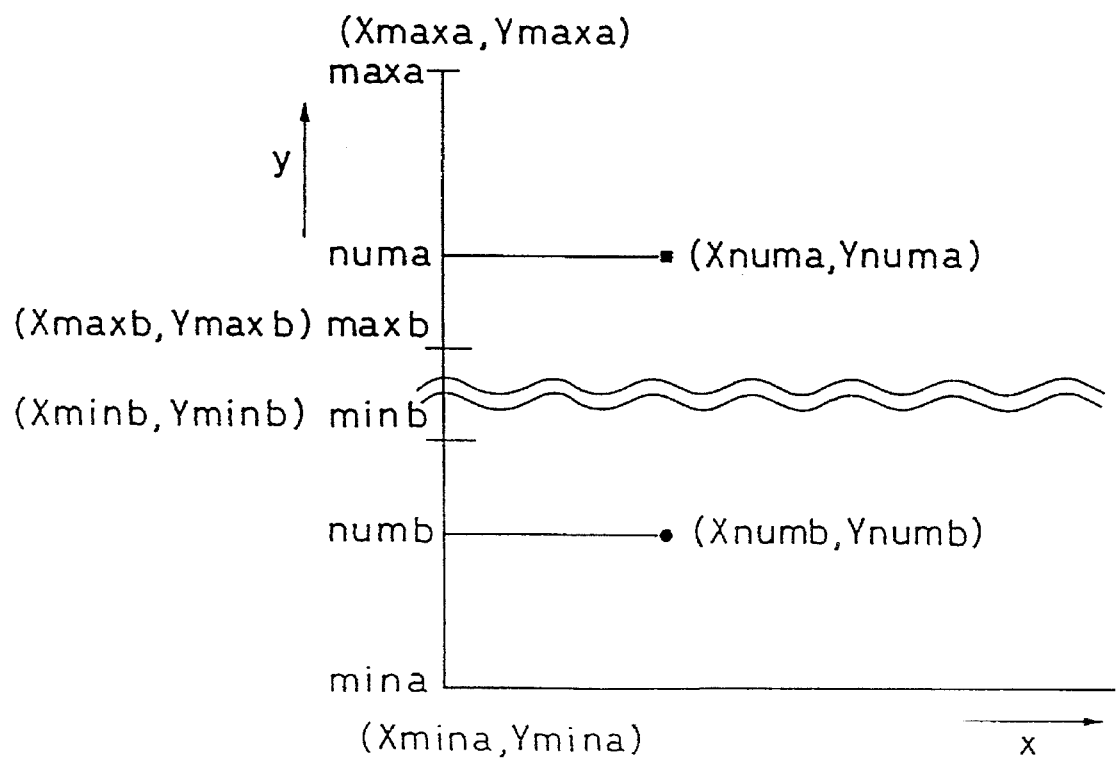
FIG. 10 is a diagram showing another method of calculating a position at which an item of numerical data is displayed on the display device shown in FIG. 1.

The display position of numerical data "numa" as shown in FIG. 10 can be obtained by the following formula:

$$per=(numa-minb)/(maxa-minb) \quad Ynuma=Yminb-\{per * (Yminb-Ymaxa)\} \quad \ldots (2)$$

where "per" represents the proportion of the data to the axis; "maxa" represents the numerical data of the maximum value of the axis; "mina" represents the minimum value of the numerical data of the axis; "maxb" represents the numerical data of the upper-limit value of the axis range to be omitted; "minb" represents the numerical data of the lower-limit value of the axis range to be omitted; and "numa" and "numb" represent the numerical data of the point displayed. "X??, Y?? " represents the display position of each item of numerical data.

[When the point is below the omission indicator]

Figure 11:
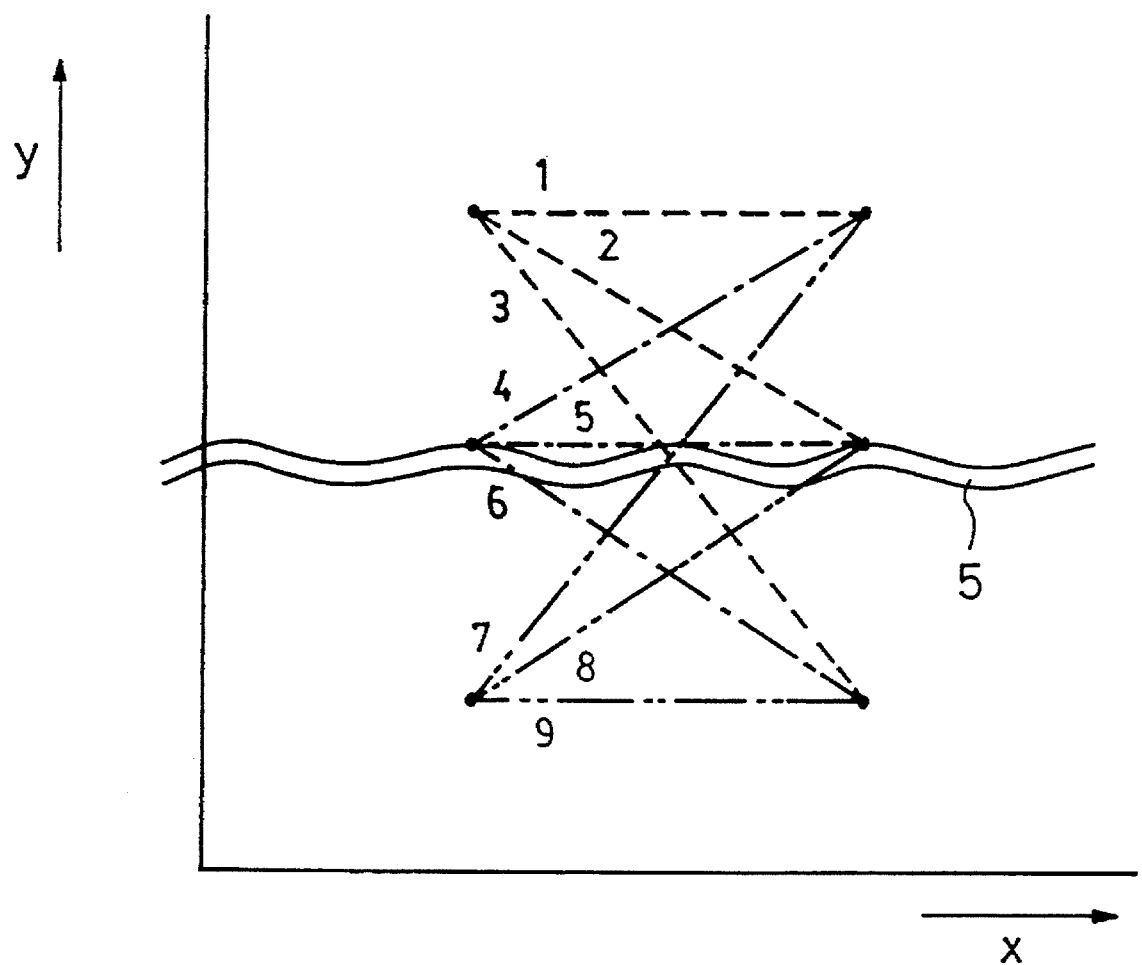
FIG. 11 is a diagram showing yet another method of calculating a position at which an item of numerical data is displayed on the display device shown in FIG. 1.

The display position of numerical data "numb" as shown in FIG. 11 can be obtained from the following formula:

$$per=(numb-mina)/(maxb-mina) \quad Ynumb-Ymina-\{per * (Ymina-$$

$Ymaxb)$} ...(3)

where "per" represents the proportion of the data to the axis; "maxa" represents the numerical data of the maximum value of the axis; "mina" represents the minimum value of the numerical data of the axis; "maxb" represents the numerical data of the upper-limit value of the axis range to be omitted; "minb" represents the numerical data of the lower-limit value of the axis range to be omitted; and "numb" represents the numerical data whose display position is to be obtained. "X??, Y??" represents the display position of each item of numerical data.

[When the point is in the omission indicator]

The numerical data in the omitted range is placed on the center line of the omission indicator 5 (the center line 6 shown in FIG. 5). When effecting partial axis omission, the display position is obtained by using the above three types of formulae. Next, a method of drawing a line connecting two points will be described with reference to FIGS. 11 through 15.

FIG. 11 is a schematic diagram showing examples of a method of drawing a line connecting two points. Numerals 1–9 indicate line patterns connecting two points.

As shown in FIG. 11, when partial axis omission is effected, nine types of patterns, 1–9, can be considered in connection with the way two points are displayed.

Figure 12:
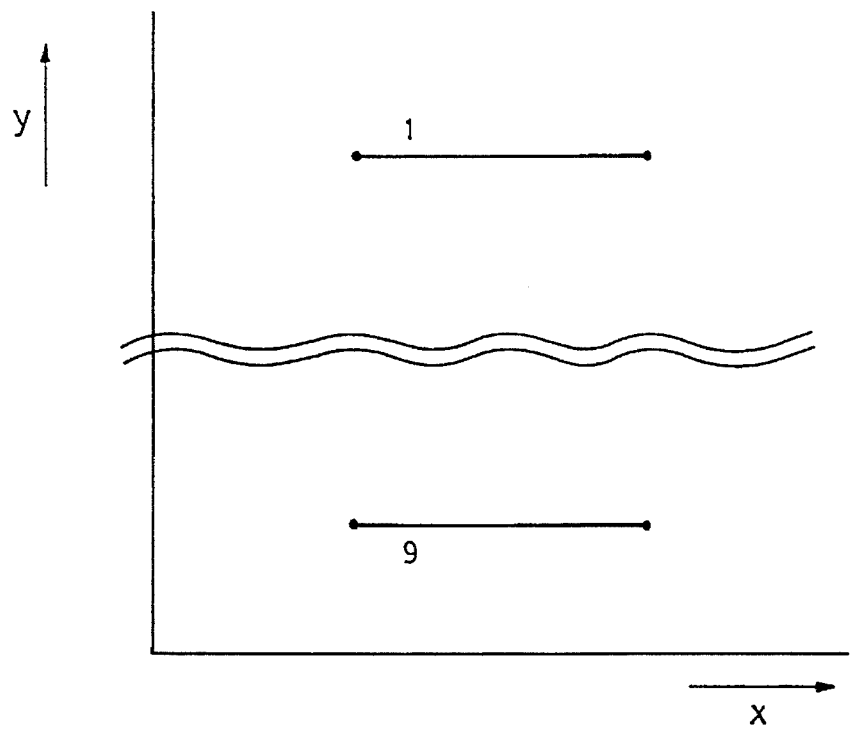
FIG. 12 is a diagram showing a method of determining a position at which an item of numerical data is displayed on the display device shown in FIG. 1.

Of these line patterns, line patterns 1 and 9 do not cross the omission indicator 5. Thus, the display position of each point is obtained from the above conversion formulae, and a segment connecting the two points is displayed as shown in FIG. 12.

Figure 13:
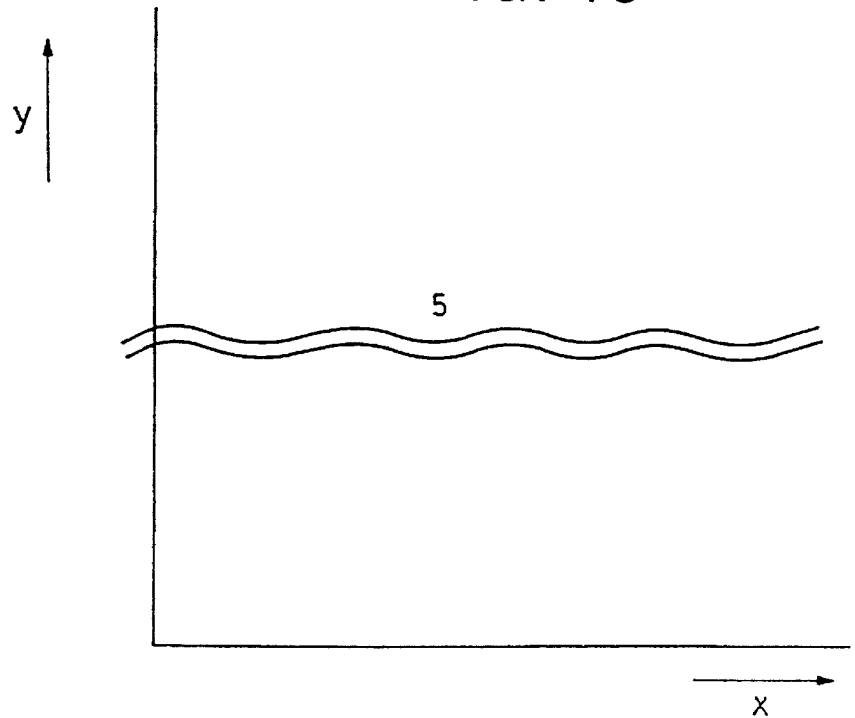
FIG. 13 is a diagram showing another method of determining a position at which an item of numerical data is displayed on the display device shown in FIG. 1.

In the case of line pattern 5 shown in FIG. 11, in which the two points are both in the omission indicator 5, no segment connecting them is displayed, as shown in FIG. 13.

Figure 14:
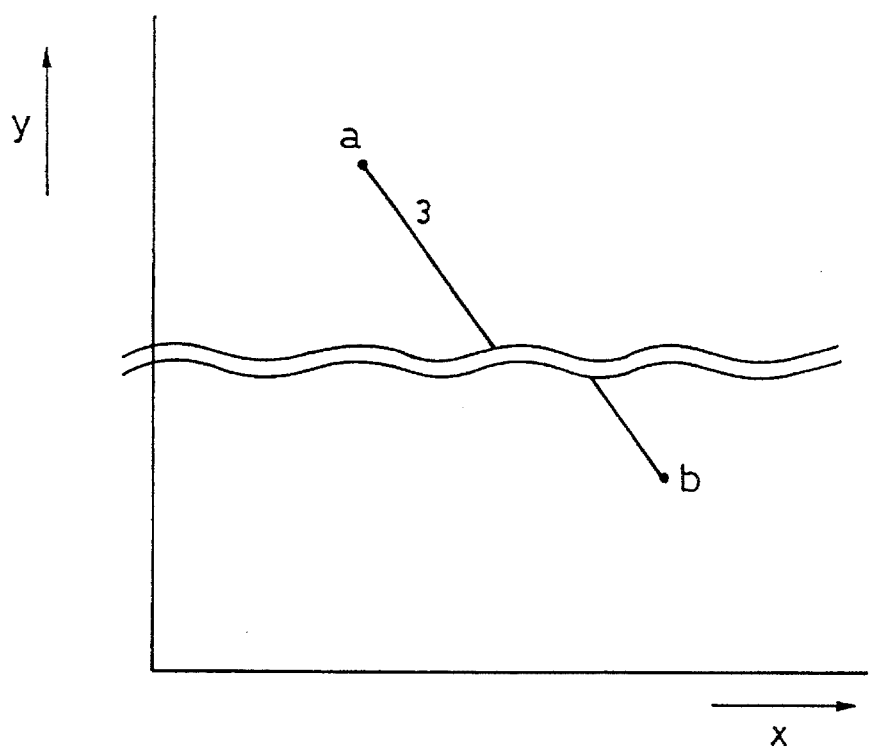
FIG. 14 is a diagram showing yet another method of determining a position at which an item of numerical data is displayed on the display device shown in FIG. 1.

In the case of line patterns 3 and 7 shown in FIG. 11, in which the line connecting the two points crosses the omission indicator 5, the following operations are conducted: first, the display positions of point (a) and point (b) are obtained on the basis of formula (1), and then the slope of the line connecting the two points is obtained on the basis of the obtained display positions of the points. Next, the display position of point (a) is obtained on the basis of formula (2). As shown in FIG. 14, a segment which extends from the obtained point (a) by using formula (2) toward the omission indicator 5 and which has the slope thus obtained is displayed. Next, the display position of point (b) is obtained on the basis of formula (3). As shown in FIG. 14, a segment is then displayed which extends from the obtained point (b) by using formula (3) toward the omission indicator 5 and which has the slope obtained.

Figure 15:
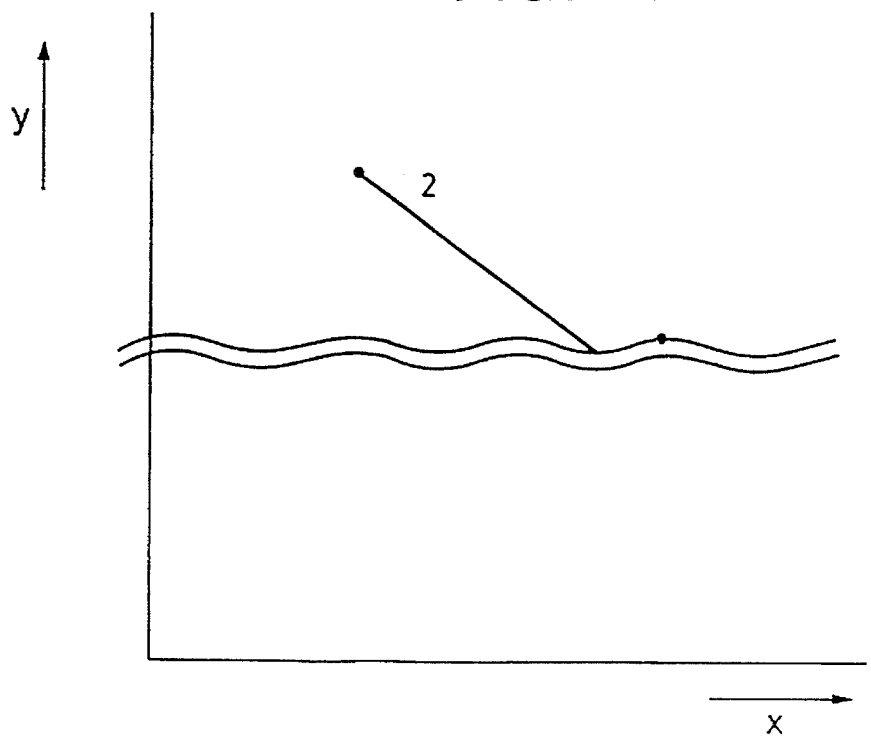
FIG. 15 is a diagram showing yet another method of determining a position at which an item of numerical data is displayed on the display device shown in FIG. 1.

In the case of patterns 2, 4, 6 and 8 shown in FIG. 11, in which one of the two points is in the omission indicator 5, the following operations are conducted: by using the point which is outside the omission indicator 5 as the reference point, the display position of the other point and the slope of the line connecting the two points are obtained, and, as shown in FIG. 15, a segment is displayed which extends from the point used as the reference toward the omission indicator 5. Such are general examples of the method of obtaining display positions of numerical data and drawing a line connecting two points. In this embodiment, the display position of any item of numerical data in the omitted range is regarded to be at the intersection of the center line 6 of the omission indicator 5 and a line perpendicular to the center line from the corresponding point.

Figure 16:
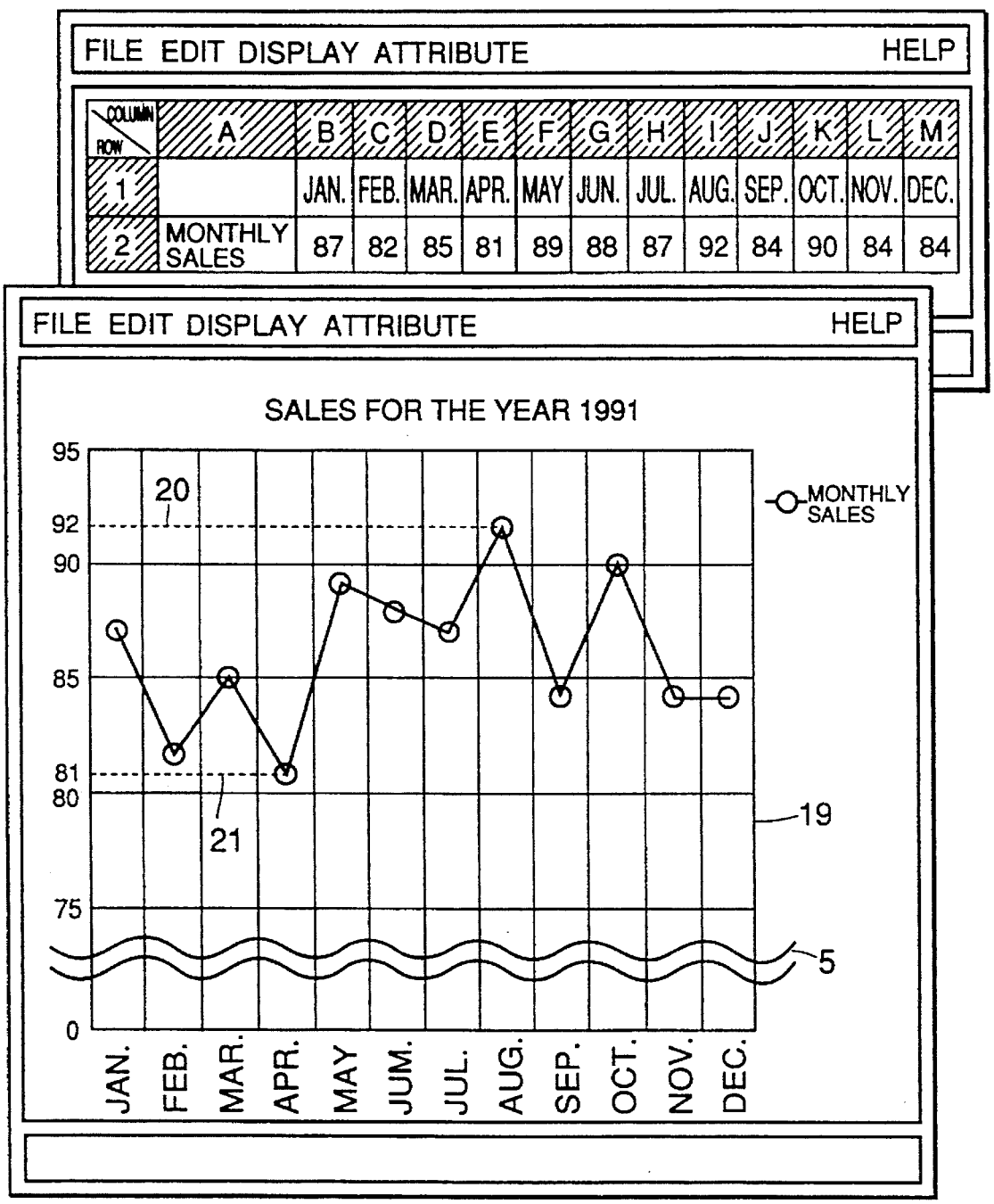
FIG. 16 is a diagram showing graph-display results obtained by a graph display system according to an embodiment of this invention.

When the display position of each item of numerical data has thus been obtained in step (6), the central processing unit 3 displays a graph 19 as shown in FIG. 16 (step (7)). Further, the omission indicator 5 is displayed in this graph (step (8)), and the maximum value 20 ("92", in this embodiment) and the minimum value 21 ("81", in this embodiment) of the graph 19 are displayed (step (9)).

In the above embodiment, it is also possible for the maximum and minimum values of the Y-axis to be obtained through automatic calculation by the central processing unit or through data input from the input device 2.

Figure 18:
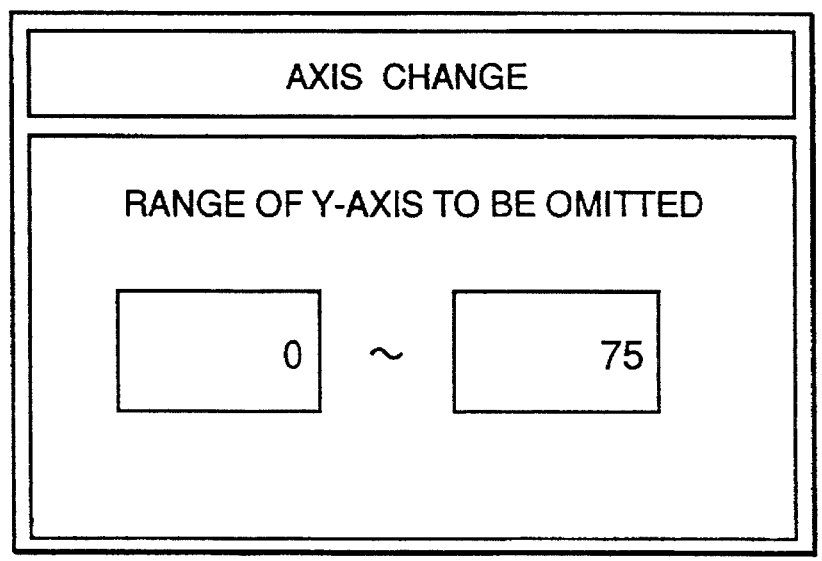
FIG. 18 is a diagram showing yet another example of the data setting window for axis change in the display device shown in FIG. 1.

While in the above-described method "the range of Y-axis to be displayed" was numerically designated in step (1) of FIG. 3, as shown in FIG. 8, it is also possible to adopt the following method, which includes the steps of: providing a command for designating the start of an axis-omission processing; displaying a window as shown in FIG. 18 for numerically inputting "the range of Y-axis to be omitted"; storing the maximum and minimum values of "the range of Y-axis to be omitted" input from the input device 2 in the storage device 4; determining the maximum and minimum values of the Y-axis from the maximum and minimum values of the data to be displayed as a graph and storing them in the storage device 4; and performing the same procedures as those from step (4) of FIG. 3 onward in accordance with these stored values, thereby forming a graph in which "the range of Y-axis to be omitted" has been omitted.

Figure 17:
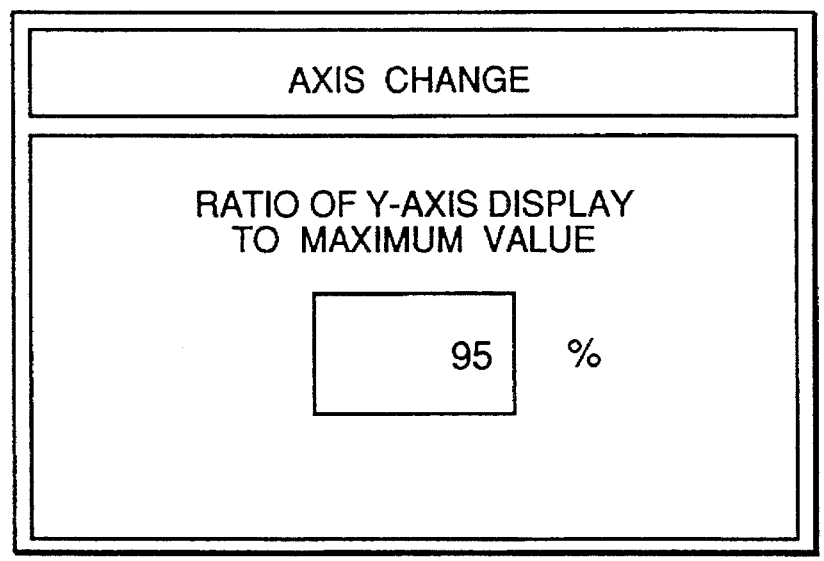
FIG. 17 is a diagram showing another example of the data setting window for axis change in the display device shown in FIG. 1.

The range to be omitted may be designated by providing, as shown in FIG. 17, a window for designating the "ratio of the Y-axis display to the maximum value". When, for example, 95% is designated, as in the case of FIG. 17, the maximum value of the numerical data to be displayed as a graph is obtained, and then a value corresponding to 95% of this maximum value is obtained, the range below this value being defined as the region to be omitted.

Further, instead of inputting data specifying the range to be omitted, it is possible to adopt a method based on an automatic calculation by the central processing unit 3.

When adopting such an automatic-calculation method, the omission rate, for example, the percentage of the upperlimit value of the range to be omitted with respect to the minimum value of the numerical data, is determined beforehand and stored in the storage device 4. By referring to the omission rate thus stored in the storage device 4, the central processing unit 3 obtains the Y-axis range to be omitted. This will be explained with reference to the data of Table 16 shown in FIG. 6.

First, assuming that 90% or less of the minimum value is to be omitted,

Omission range=(the minimum value of the numerical data) * (the omission rate, i.e., 90%)  ...(4)

From equation (4), the omission range is (81 * 0.9)= 72.9. Therefore, as for rounding off,the Y-axis range to be omitted is from "0" to "75".

Figure 19:
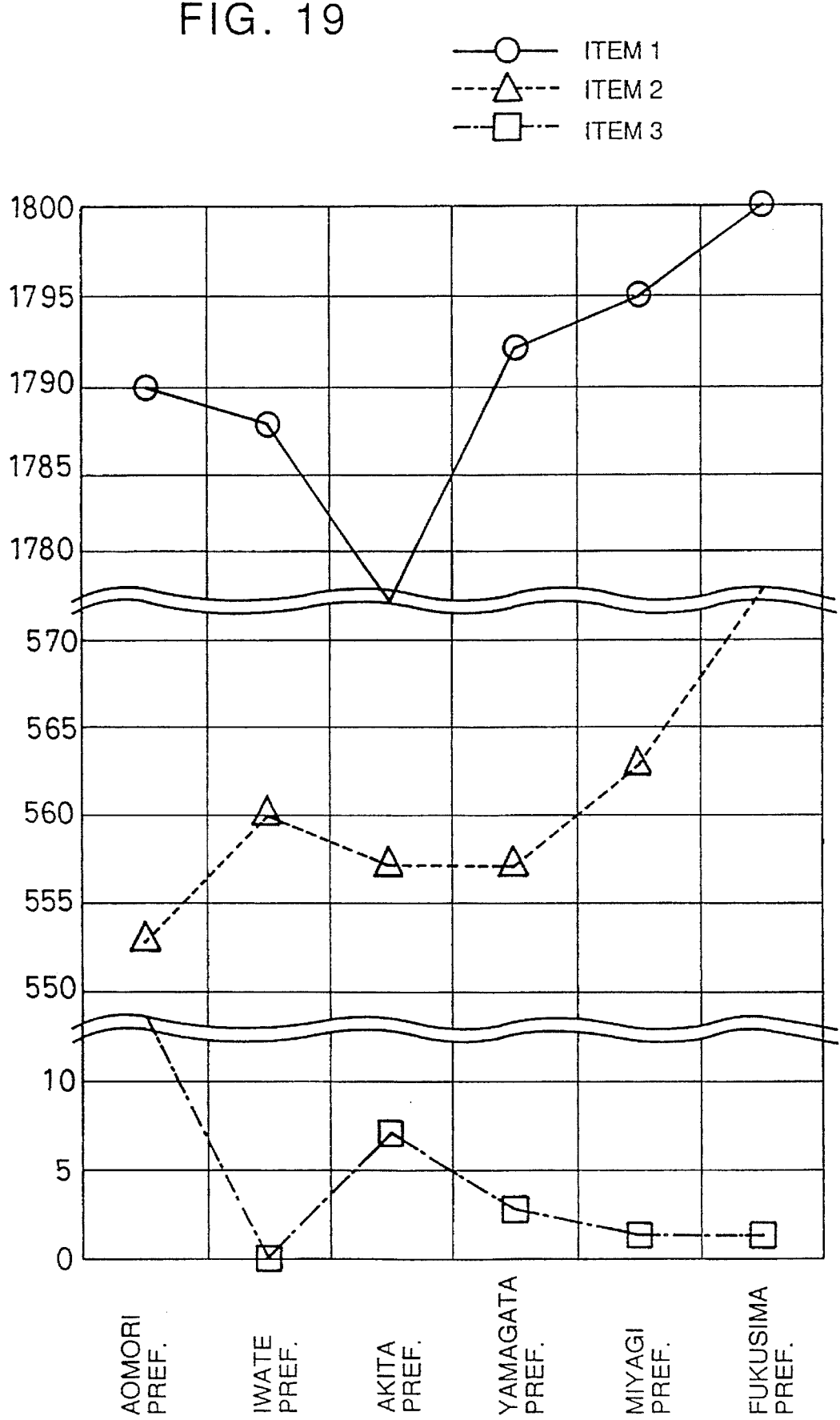
FIG. 19 is a diagram showing other graph-display results obtained by a graph display system according to an embodiment of this invention.

While in the above embodiment one Y-axis range in a graph was omitted, it is also possible to adopt a system in which, as shown in FIG. 19, a plurality of Y-axis ranges in a graph can be designated for omission, thereby providing a precise, simultaneous display of the fluctuation of each of a plurality of items.

Further, by making it possible to specify the axis to be partially omitted, through use of the window as shown in FIGS. 8, 18, etc., and conducting the operations of steps (4) and (6) in the flowchart of FIG. 3 after effecting axis conversion, it is possible to effect a partial omission not only along the Y-axis dimension but also along the dimension of a desired axis specified by the operator.

What is claimed is:

1. A method of forming graphs comprising the steps of:

storing numerical data to be presented as a graph;

determining an omission-range, which is a range of data to be omitted from presentation in the graph;

determining display positions for the stored numerical data on a two-part display range comprising two display ranges, which are disposed on either side of the omission-range; and forming a graph corresponding to the stored numerical data on the two-part display-range, with the two-display-ranges divided by an omission mark, based on the display positions determined in the step of determining display positions.

2. A method according to claim 1, wherein a connecting line is prepared to connect portions of numerical data displayed side by side in the graph respectively on either side of the range of data to be omitted.

3. A method according to claim 1, wherein a connecting line is prepared to connect portions of numerical data displayed side by side in the graph with numerical data included in the range of data to be omitted.

4. A method of forming graphs according to claim 1, further comprising a step of determining the omission-range in accordance with the input numerical data.

5. A method of forming graphs according to claim 1, further comprising steps of generating an omission indicator, and outputting the omission indicator with the data showing the stored numerical data on either side of the range of data that is to be omitted.

6. A method of forming graphs according to claim 1, wherein the formed graph is displayed in a display device.

7. An apparatus for forming graphs comprising:

storage means for storing numerical data to be presented as a graph;

determining means for determining an omission-range, which is a range of data to be omitted from presentation in the graph;

determination means for determining display positions for the stored numerical data on a two-part display-range, comprising two display ranges which are disposed-on either side of the omission-range; and formation means for forming a graph corresponding to the stored numerical data on the two-part display-range with the two display ranges divided by an omission mark, based on the display positions determined by said display-position determination means.

8. An apparatus according to claim 7, further comprising connecting line preparing means for preparing a connecting line to connect portions of numerical data displayed side by side in the graph respectively on either side of the range of data to be omitted.

9. An apparatus according to claim 7, further comprising connecting line preparing means for preparing a connecting line to connect portions of numerical data displayed side by side in the graph with numerical data included in the range of data to be omitted.

10. An apparatus for forming graphs according to claim 7, further comprising means for determining the omission-range in accordance with input numerical data.

11. An apparatus for forming graphs according to claim 7, further comprising means for generating an omission indicator, and outputting the omission indicator with the data showing the stored numerical data on either side of the range of data to be omitted.

12. An apparatus for forming graphs according to claim 7, wherein the formed graph is displayed in a display device.

13. A method of forming graphs comprising the steps of:

storing numerical data to be presented as a graph;

inputting area data specifying an area of the stored numerical data to be displayed;

determining two ranges based on the input area data, the two ranges corresponding to an omission-range, the omission-range being a range of data to be omitted from display in the graph to be formed, and a display-range for displaying the data positions on the graph to be formed;

determining two different scales based respectively on the determined two ranges, the two scales corresponding to a display scale and an omission scale in the display-range and the omission-range, respectively; and forming a graph containing data positions obtained by converting the stored numerical data in the display-range by means of the display scale, the omission scale in the omission-range, and an omission indicator.

14. A method of forming graphs according to claim 13, wherein the area data is input as numerical data by means of a keyboard.

15. A method of forming graphs according to claim 13, wherein the formed graph is displayed in a display device.

16. An apparatus for forming graphs comprising:

storage means for storing numerical data to be presented as a graph;

input means for inputting area data specifying an area of the stored numerical data to be displayed;

first determining means for determining two ranges based on the input area data, the two ranges corresponding to an omission-range, the omission-range being a range of data to be omitted from presentation in the graph to be formed, and a display-range for displaying the data positions on the graph to be formed;

second determining means for determining two scales different based respectively on the determined two ranges, the two scales corresponding to a display scale and an omission scale in the display-range and the omission-range, respectively; and formation means for forming a graph containing data positions obtained by converting the stored numerical data in the display-range by means of the display scale, the omission scale in the omission-range, and an omission indicator.

17. An apparatus for forming graphs according to claim 16, wherein the area data is input as numerical data by means of a keyboard.

18. An apparatus for forming graphs according to claim 16, wherein the formed graph is displayed in a display device.

* * * * *

UNITED STATES PATENT AND TRADEMARK OFFICE
CERTIFICATE OF CORRECTION

PATENT NO. : 5,485,564

DATED : January 16, 1996

INVENTOR(S) : AYAKO MIURA

It is certified that error appears in the above-identified patent and that said Letters Patent is hereby corrected as shown below:

On the title page, item

[75] INVENTOR

"Midorigaoka" should read --Tokyo--.

COLUMN 5

Line 54, ""0"" should read --"0",--.
Line 63, "(step (4)." should read --(step (4))--.

COLUMN 6

Line 12, ""92" the," should read --"92", the--.
Line 45, "(When" should read -¶ (When-.
Line 67, "Ynumb-Ymina" should read --Ynumb=Ymina--.

COLUMN 7

Line 22, "1 -9" should read --1-9--.

COLUMN 8

Line 36, "upperlimit" should read --upper-limit--.
Line 51, 'off,the" should read --off, the--.

UNITED STATES PATENT AND TRADEMARK OFFICE
CERTIFICATE OF CORRECTION

PATENT NO. : 5,485,564

DATED : January 16, 1996

INVENTOR(S) : AYAKO MIURA

It is certified that error appears in the above-identified patent and that said Letters Patent is hereby corrected as shown below:

COLUMN 9

Line 9, "two-dis-" should read --two dis- --.
    Line 40, "disposed-on" should read --disposed on--.

COLUMN 10

Line 42, "scales" should read --different scales--.
    Line 43, "different" should be deleted.

Signed and Sealed this

Twenty-eighth Day of May, 1996

Attest:

BRUCE LEHMAN

*Attesting Officer*      *Commissioner of Patents and Trademarks*